Feb. 20, 1962      M. HUSEMAN      3,021,660

GAUGE ATTACHMENT FOR COMBINES

Filed May 29, 1959      2 Sheets-Sheet 1

Martin Huseman
INVENTOR.

BY *O'Brien and Harvey B. Jackson*
Attorneys

Feb. 20, 1962  M. HUSEMAN  3,021,660
GAUGE ATTACHMENT FOR COMBINES
Filed May 29, 1959  2 Sheets-Sheet 2
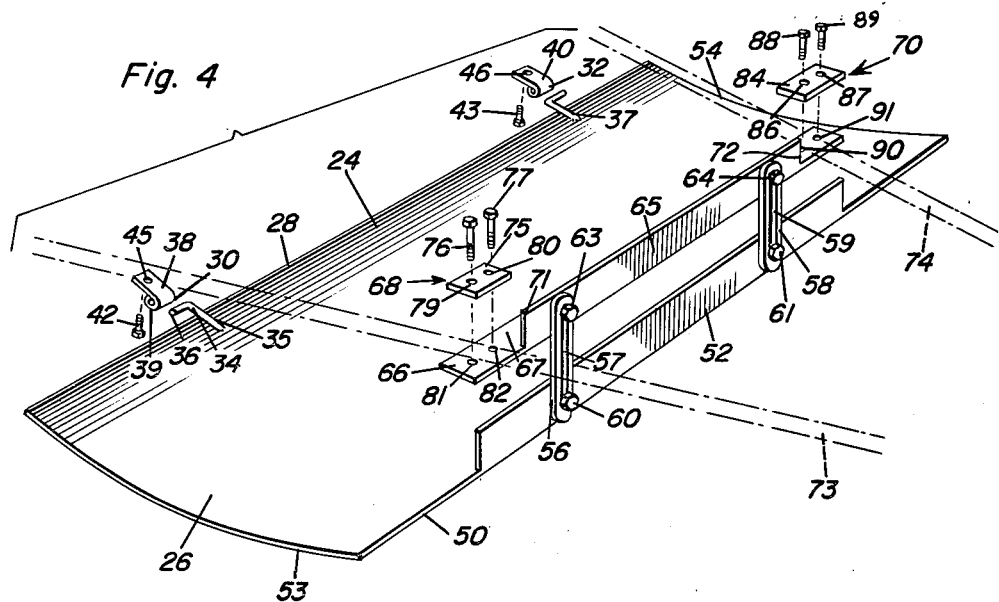
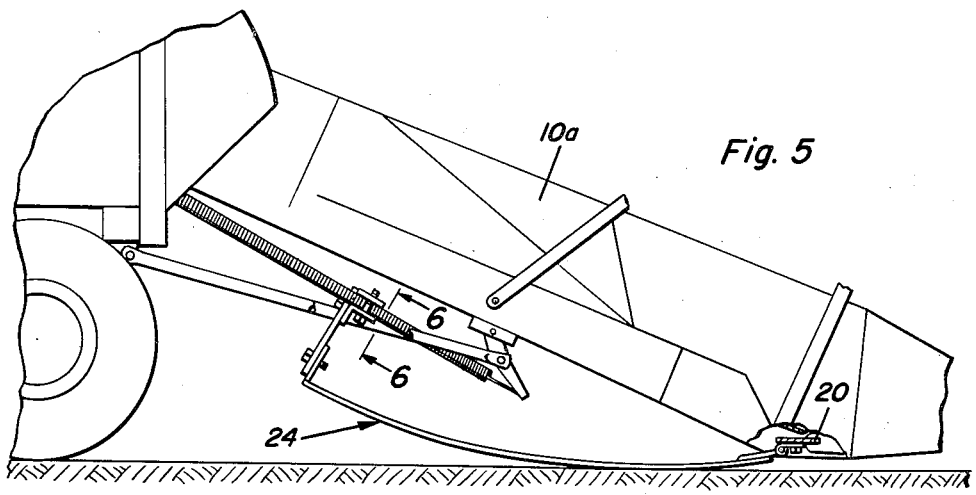
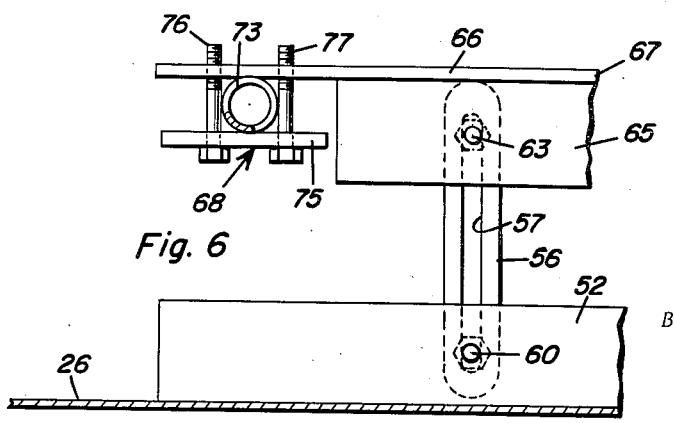
Martin Huseman
INVENTOR.

United States Patent Office 3,021,660
Patented Feb. 20, 1962

3,021,660
GAUGE ATTACHMENT FOR COMBINES
Martin Huseman, Schaller, Iowa
Filed May 29, 1959, Ser. No. 816,820
1 Claim. (Cl. 56—210)

This invention relates to a combine attachment and is a continuation-in-part of pending application U.S. Serial No. 734,880, filed on May 13, 1958, now abandoned. A claim is made for the early filing date of the parent application as to all subject matter common to this application and the earlier filed parent application.

The object of the invention is to provide a gauge attachment for combines which furnishes a floating platform which fits beneath the combine inlet chute to hold the inlet chute in a definite spatial relationship to the ground surface so that the combine operates much more effectively.

Another object of the invention is to provide a height gauge attachment for a combine or other implement, the height gauge attachment being capable of being mounted on a number of manufacturers' makes of conventional implements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an exploded perspective view of the parts from which the gauge attachment is constructed.

FIGURE 5 is a fragmentary elevational view of another conventional farm implement showing the gauge attachment applied thereto but in another adjusted position.

FIGURE 6 is an enlarged sectional view taken on the line 6—6 of FIGURE 5, this figure differing from FIGURE 3 merely by the reversal of clamp parts of the attachment.

Figure 1:
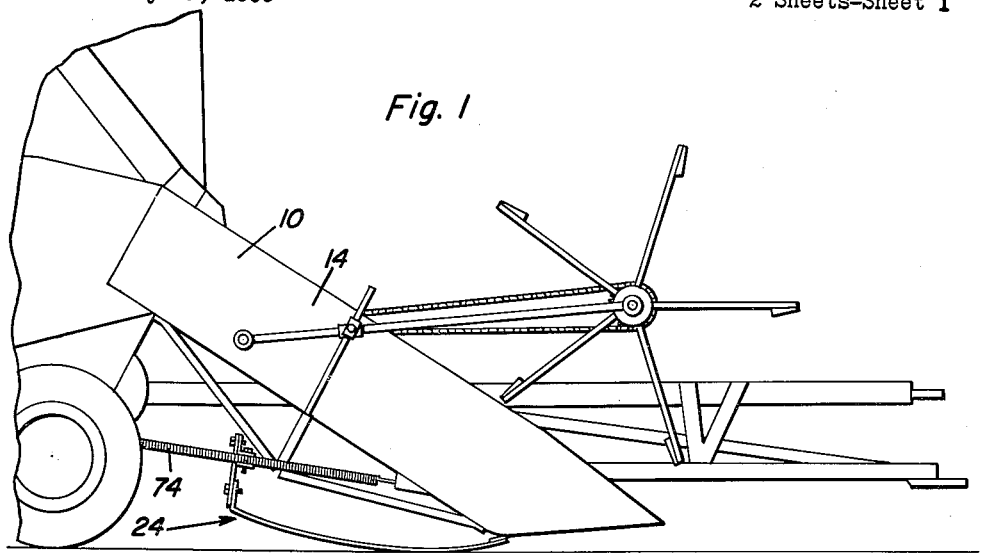
FIGURE 1 is a side elevational view of the gauge attachment applied to one type of conventional combine.

In the accompanying drawings there is shown a conventional combine 10 which includes, among other conventional structures, a combine chute 14, a conveyor 16 in the chute, together with cutter 18 at the inlet end of chute 14. Cutter 18 has a stationary transverse support 20 adjacent thereto and mounted in advance of (with reference to the direction of travel of the combine) conveyor 16 and to which a hinge connection 22 is made with the height gauge 24.

Height gauge 24 or height gauge attachment for combine 10 is made of an approximately rectangular panel 26 which is smoothly curved in cross-section so that the general appearance is that of a segment of a cylinder of large diameter. The particular construction of panel 26 is shown in FIGURE 4. Front edge 28 of panel 26 is straight and has two hinges 30 and 32 connected to the panel at edge 28. Hinge 30 is made of an L-shaped bracket 34 having the longer leg 35 thereof fixed to panel 26 and having the shorter leg 36 parallel to edge 28 and functioning as a hinge pin. Bracket 37 of hinge 32 is identical to bracket 34. The balance of hinge 30 is made of a short plate 38 having a hinge butt 39 at one edge within which short leg 36 of bracket 34 is located thereby forming the hinge construction. The short plate 40 of hinge 32 is identical in all respects to hinge plate 38 and completes the structure of hinge 32.

It only requires two bolts 42 and 43 to connect hinges 30 and 32 to transverse support 20. These bolts are passed through apertures 45 and 46 in the plates 38 and 40 of hinges 30 and 32 and are threaded into tapped openings in support 20 or pass completely through smooth bore openings in the support and held in place by nuts.

Panel 26 extends rearwardly and is located beneath chute 10. The rear edge 50 of panel 26 has an upstanding flange 52 the ends of which are spaced inwardly from the side edges 53 and 54 of panel 26. A pair of hanger straps 56 and 58 provided with vertical slots 57 and 59, are attached to flange 52 by means of bolts 60 and 61 which are received in threaded openings in flange 52. Bolts 63 and 64 also extend through slots 57 and 59, and these are received in tapped openings of flange 65.

Flange 65 is the upstanding flange of an angle member 66, the flange 67 of angle member 66 being perpendicular to flange 65. Two clamps 68 and 70 are operatively connected to flange 66, noting that flange 65 terminates short of the extreme ends of flange 66 thereby leaving notches 71 and 72 through which parts 73 and 74 of a combine or other implement may pass. Clamp 68 has clamp plate 75 attached to flange 66 by means of a pair of bolts 76 and 77. Clamp plate 78 is provided with openings 79 and 80 through which bolts 76 and 77 pass, and these bolts are received in threaded apertures 81 and 82 in flange 66. Clamp 70 is composed of a clamp plate 84 having apertures 86 and 87 through which bolts 88 and 89 pass, these bolts ultimately being received in apertures 90 and 91 in the extremity of flange 66. The parts 73 and 74, which shall be identified subsequently, are received between the pairs of bolts and also between confronting surfaces of the members of clamps 68 and 70.

Figure 2:
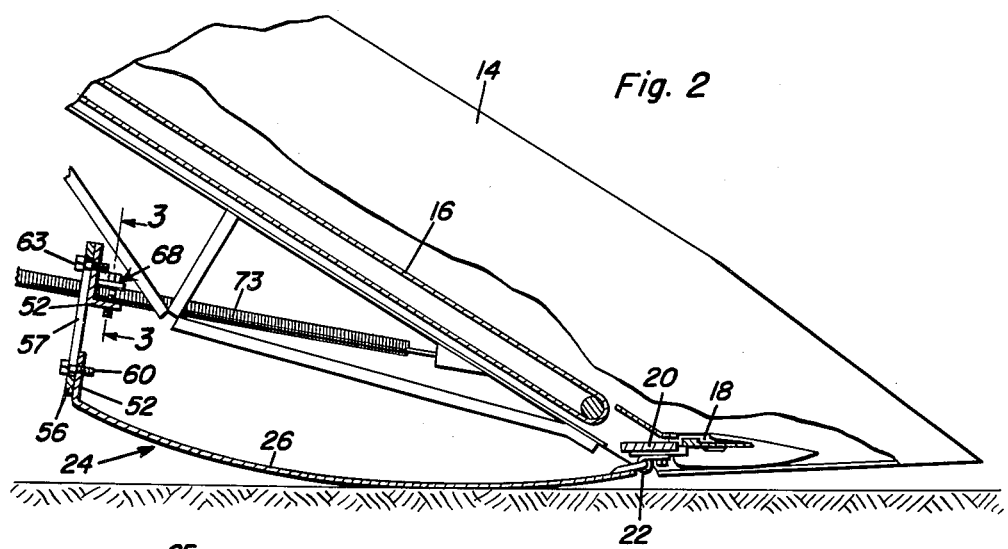
FIGURE 2 is an enlarged sectional view of the gauge attachment, this view showing a part of the combine in section to better illustrate the relationship between the gauge attachment and a conventional combine.
Figure 3:
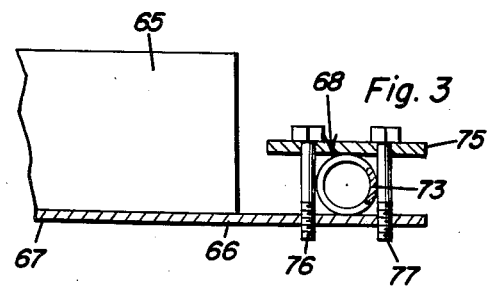
FIGURE 3 is an enlarged sectional view taken on the line 3—3 of FIGURE 2 and on an enlarged scale.

As shown in FIGURES 2 and 3 the combine chute 14 being conventional and of one type, has a pair of springs identified as the parts 73 and 74. By using the springs as the means by which to support the rear edge of the panel 26 a limited amount of floating movement about the aligned axes of hinges 30 and 32 may be obtained. In assembly, clamps 68 and 70 are attached to the springs 73 and 74 as illustrated. FIGURES 5 and 6 merely show that the angle member 66 may be turned upside down for some installations or under some conditions of operation. The combine 10a in FIGURE 5 has the angle member 66 so oriented.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

The combination of a harvesting machine having a vertically swingable chute, a height gauge attachment comprising a ground-engaging panel provided under said chute, hinge means provided at one edge of said panel and connecting the same to said chute, means provided at the relatively opposite edge of said panel to yieldably support said chute at a selected height above the ground, upwardly extending straps provided at the rear edge of said panel, a transversely extending member connected to the upper ends of said straps, and clamp means provided at transversely spaced points on said member, said straps having vertical slots, fastening elements extending through said slots for adjustably connecting said straps to said transverse member and to said panel, further horizontally positioned short straps parallel to said transversely extending member and including bolts passing through the same and the ends of said transverse member for providing further attachment means.

References Cited in the file of this patent

UNITED STATES PATENTS

| | | |
|---|---|---|
| 2,509,357 | Krause | May 30, 1950 |
| 2,875,568 | Watamaker | Mar. 3, 1959 |